April 21, 1942. E. D. TILLYER 2,280,322
OPHTHALMIC LENS
Filed April 9, 1940
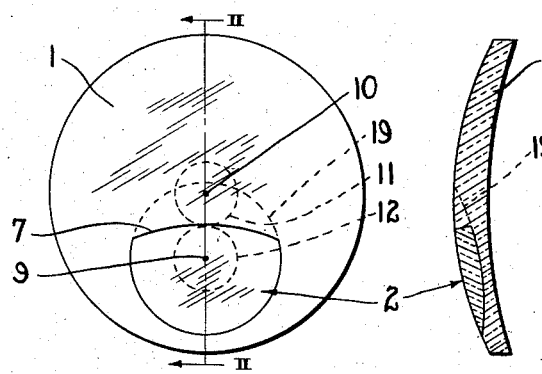
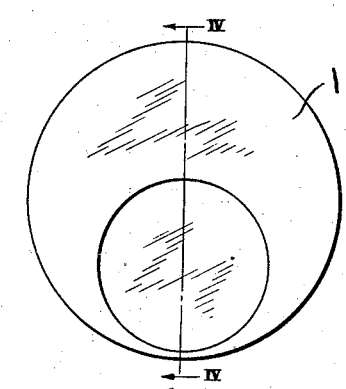
Fig. I  Fig. II  Fig. III
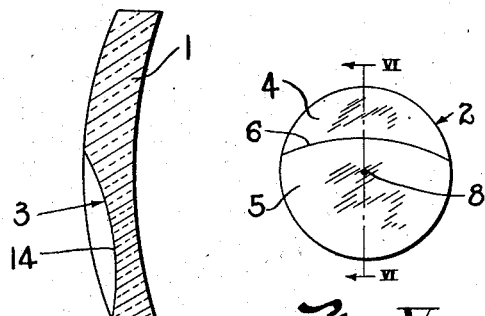
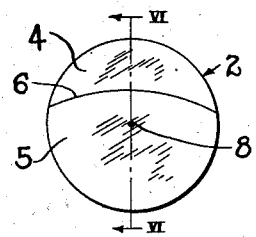
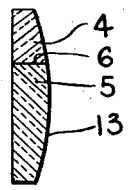
Fig. IV  Fig. V  Fig. VI
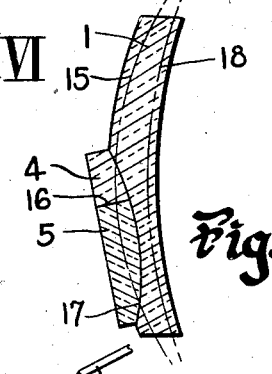
Fig. VII
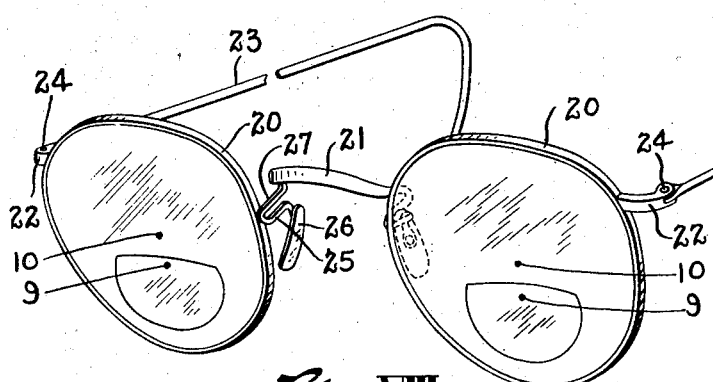
Fig. VIII
INVENTOR.
EDGAR D. TILLYER
BY Harry H. Styll
ATTORNEY.

Patented Apr. 21, 1942

2,280,322

UNITED STATES PATENT OFFICE 2,280,322

OPHTHALMIC LENS

Edgar D. Tillyer, Southbridge, Mass., assignor to American Optical Company, Southbridge, Mass., a voluntary association of Massachusetts Application April 9, 1940, Serial No. 328,731

2 Claims. (Cl. 88—54)

This invention relates to ophthalmic lenses and more particularly to bifocal or multifocal lenses and to an improved process of making the same.

This application is a continuation in part of my copending application, Serial No. 235,512, filed October 17, 1938.

One of the principal objects of the invention is to provide improved means and process of making bifocal or multifocal lenses whereby the degree of displacement or jump of image as the eye passes over the line of division between the separate focal fields of the lens will be greatly eliminated, with the optical centers of the several fields related to each other to best optical advantage, and the cost of production and difficulty of manufacture usual in lenses of this character is greatly reduced.

Another important object of the invention is to provide improved lens medium and methods of making lenses of the above character which will insure stable fusion of the parts, eliminate fogging or color distortion throughout the fused surfaces and avoid incipient crystallization throughout said fused surfaces.

Another important object of the invention is to provide a novel glass for use in forming the major portion of the lens which may be used as the filler piece adjacent a piece of high index glass which is fused to said major portion during the process of forming a lens of the character described whereby fusion will take place without a graying at the interface or without interfacial crystallization.

Another important object is to carefully control the potassium oxide and sodium oxide content in the base batch so as to carefully balance all the ingredients of said base batch whereby the resultant glass will have the desired index of refraction, reciprocal relative dispersion, coefficient of expansion, stability and fusion faculties which positively eliminates interfacial devitrification or graying at the fusion interface.

Another object is to provide a glass for the major portion of such multifocal lenses which will enable the use of ordinary standardized commercial tools in forming the desired optical surfaces on said major portion.

Another object is to provide suitable high index glasses which may be used with the glass of said major portion and which will fuse stably to said major portion and a filler piece of said glass without danger of warping, cracking or discoloration.

Another object is to provide an economical crown lens glass having an index of refraction of approximately 1.52 and a reciprocal relative dispersion of about 58 with a combined sodium oxide and potassium oxide content of approximately not more than 16% of the total batch with the potassium oxide content greater than 4% but less than the soda content.

Another object is to provide a practical compromise in the reciprocal relative dispersion of the parts in order to obtain the dispersive factors desired with the coefficient of expansion of the parts so related, so as to insure stable fusion without warping or cracking or discoloration.

Another object is to provide improved means and method of forming lenses of the above character having desired absorptive properties.

Another object is to provide improved means and method of forming lenses of the above character wherein the relation of optical centers of the different focal fields may be controlled to best advantage and the coefficients of expansion, dispersions, absorption properties, fusion faculties are controlled and difficulties as to discoloration, distortion, tarnish, etc., are eliminated.

Another object is to provide ophthalmic lens blanks and method of making same having the above characteristics.

Another object is to provide improved means and method of controlling the size and shape of segment in lenses of the above character.

Other objects and advantages of the invention will become apparent from the following description taken in connection with the accompanying drawing, and it will be understood that many changes may be made in the details of construction, arrangement of parts and steps of the process without departing from the spirit of the invention as expressed in the accompanying claims. I, therefore, do not wish to be limited to the exact details of construction and steps of the process shown and described, as the preferred form only has been given by way of illustration.

Referring to the drawing:

Fig. I is a front elevation of the lens embodying the invention;

Fig. II is a sectional view taken as on line II—II of Fig. I;

Fig. III is a face view of the major portion of the semi-finished blank;

Fig. IV is a sectional view as taken on line IV—IV of Fig. III;

Fig. V is a face view of the two-part button;

Fig. VI is a sectional view taken as on line VI—VI of Fig. V;

Fig. VII is a sectional view of the semi-finished blank showing the button in fusing relation with the major portion and illustrated in dot and dash lines the forming of the finished surfaces of the lens; and Fig. VIII is a perspective view of an ophthalmic mounting embodying the lenses of the invention.

It has been usual in the past in forming bifocal or multifocal lenses to make use of a major portion of glass of one index of refraction having a circular countersink therein, and to fuse a minor portion of a different index of refraction in said circular countersink. With such lenses, when the eye passes from one focal field into the other, there is a considerable displacement of image due to the prismatic effect introduced by the fused-in button.

Great difficulty has also been encountered in the past in obtaining suitable optical glasses for forming lenses of the character described. That is, optical glasses which would not distort during fusion and which would not introduce fogged surfaces and incipient crystallization throughout the fused surfaces.

It, therefore, is one of the primary objects of this invention to overcome the above difficulties by providing a bifocal or multifocal lens and method of making the same, whereby the optical centers of the reading and distance fields will be placed at controlled positions on the opposite sides of the line of division between the two fields so that when the eye traverses said line of division either from the distance field into the reading field or vice versa, it immediately falls within the area of the optical centers of said fields and thereby uses the most optically accurate portions of said fields.

It also is an important object of this invention to provide lens mediums of controlled melting points, coefficients of expansion, indices of refraction and composition whereby all of the difficulties of distortion, discoloring, fogging or clouding and crystallization are eliminated.

Referring more particularly to the drawing wherein like characters of reference designate like parts throughout the several views, the lens embodying the invention comprises broadly a major piece of lens medium 1 constituting the distance field of the lens and a minor portion 2 secured thereto and constituting the reading field of the lens.

The major portion 1 as shown in Figs. III and IV is provided with a circular countersink 3 in which the minor portion 2 is secured as by fusion, cementing, or the like. This major portion is of an economical Crown lens glass having an index of refraction of approximately 1.5232 and a reciprocal relative dispersion of about 55 to 60. This glass is very stable and has a relatively high melting or softening point. The composition of this glass is substantially as follows:

| | |
|---|---|
| $SiO_2$ | 70.76 |
| $Na_2O$ | 8.50 |
| $K_2O$ | 6.58 |
| $CaO$ | 12.45 |
| $NaCl$ | .85 |
| $Na_2SO_4$ | .35 |
| $Sb_2O_5$ | .71 |

The expansion is such that two pieces of such glass will successfully and stably fuse with each other and will also fuse with the minor portion 2 of the reading field with no danger of discoloration or fogging, or of crystallization at the interface; that is, the said glasses will fuse without danger of introduction of the so-called fogged or milk segment which is commonly known in the art and one of the major difficulties encountered in forming fused type lenses.

It will be noted that in the formula given above for the glass used in making the major portion of the lens, that the percentage of potassium oxide given is 6.58 per cent. That is, the percentage of potassium oxide has been increased over that in prior glasses of this type, at the expense of the percentage of sodium oxide, which has been decreased a corresponding amount to allow for the increase in potassium oxide and yet maintain the other desired optical, physical and chemical properties of the glass. This increase in potassium oxide eliminates the fogging or bluing of the glass when the parts are fused together.

I have found that the glass, to overcome the difficulties found in the past, must contain 4 per cent or more potassium oxide to have the desired qualities. Particular attention, therefore, is given to the percentage of potassium oxide.

It is particularly pointed out that with the composition set forth herein which has other desirable optical properties, the control of potassium oxide as given herein is extremely essential in order to render such compositions practical for use in forming ophthalmic lenses and this therefore is one of the outstanding features of the invention.

The minor portion 2 as shown in Figs. V to VII inclusive, comprises two pieces of glass 4 and 5 secured in edge to edge relation with each other as by fusion or other suitable means along a dividing line 6, extending in a direction transversely of the major portion of the lens. The portion 4 is formed of lens medium identically or substantially identically the same as that of the major portion 1.

The portion 5, however, is of a different index of refraction from that of the portions 1 and 4. One of the preferred glasses for the portion 5 has a relatively high index of refraction of approximately 1.616, having a reciprocal relative dispersion of approximately 48 to 54. The composition of this glass, which has been used with good results, is substantially as follows:

| | |
|---|---|
| $SiO_2$ | 41.05 |
| $B_2O_3$ | 4.95 |
| $TiO_2$ | 1.93 |
| $CaO$ | 5.19 |
| $PbO$ | 6.90 |
| $BaO$ | 29.55 |
| $Na_2O$ | 4.41 |
| $K_2O$ | 1.98 |
| $Sb_2O_5$ | .61 |
| $As_2O_5$ | .31 |
| $ZnO$ | 3.12 |

In forming the minor portion 2 the line of division 6 which forms the dividing line 7 between the major field 1 and minor field 2 in the finished lens, is so formed that it will be above a point 8 which in the finished lens constitutes the center 9 of the minor focal field and will be located between 3 and 4 mm. or substantially half the diameter of the pupil of the eye below the dividing line 7.

In forming the countersink 3 in the major portion 1 care is taken that it will be so located on said major portion as to cause the line of division 7, in the finished lens, to be substantially half the diameter of the pupil of the eye below the point at which the optical center 10 of the major field is to be located. With this arrangement, as the eye passes or traverses the dividing line 7 of the pupil, as illustrated by the dotted lines 11 and 12, will be clear of said dividing line and will follow immediately within the area of the most optically accurate portions of said fields; that is, within the area at which the optical centers of the fields are located.

The line of vision may be straight, arched upwardly or downwardly, as desired. This is controlled during the forming of the edged fusion surfaces along the dividing line 6.

In forming the lens, portions 4 and 5 are preferably first fused together and are then provided with a curved surface 13 shaped to fit substantially with the curved surface 14 of the countersink. The button thus formed by the portions 4 and 5 is then fused in the countersink 3 as shown in Fig. VII.

The side of the blank having the button fused thereon is then surfaced to a controlled curvature 15, which constitutes the base curve of the lens or surface formed at the factory, thereby completing the semi-finished blank. This surface 15 is ground to such a depth as to reduce the reading field to the desired diameter, and because of the different indices of refraction of the minor portion, the portion 5 will remain visible and will have a cliff-like top edge 16 transversely of the lens, forming the dividing line 7, and will have the remainder of its contour formed to a knife-like edge 17, resulting from the intersection of the countersink curve 14 with the surface 15.

Because of the fact that the lens medium of portion 4 is substantially the same or is identical to that of the major portion 1, it will blend therewith upon fusion and effectively disappear.

The reciprocal relative dispersion of the lens mediums of the portions 1 and 5 are so controlled as to substantially eliminate chromatic aberrations.

It is to be understood that if desired, suitable ingredients may be added to the lens mediums to introduce infra-red or ultra violet absorbing qualities, as well as to cut down on the visible portion of the spectrum. These ingredients are commonly known in the art.

Due to the fact that the lens medium of the portion 5 has a lower melting point than the lens medium of the portion 1, danger of distortion of the countersink curve 3 throughout the interface of the portions 5 and 1 is eliminated as the temperature used for fusion can be so controlled as to bring about the results desired without softening the surface 3 to a point where it will become distorted.

In finishing lenses of this character an optical surface 18 such as indicated by the dot and dash line in Fig. VII is formed on the opposed side of the blank. This is known in the art as a prescription curve, and in most instances is formed on the lens by lens dispensers. In forming the surface 18 care is taken that the optical center 10 of the distance field is at the desired location above the dividing line 7, as this surface in part controls the position of said optical center.

The various optical surfaces are ground and polished by devices commonly used in the art such as the automatic lens grinding and polishing machine.

In Fig. I the dotted line 19 indicates the contour of the portion 4 which disappears during fusion.

In Fig. VIII there is illustrated a conventional type of ophthalmic mounting comprising a pair of lens holding members 20 connected by suitable bridge member 21 and having temple supports 22 to which the temples 23 are pivotally attached at 24. Suitable adjustable arms 25 are provided to which nose bearing pads 26 are pivotally attached. The arms 25 are adjustable so that the optical centers 9 and 10 of the reading and distance fields may be positioned in desired relation with the line of sight through the lenses. It is apparent that by adjusting the nose pads downwardly the positions of the optical centers may be raised relative to the line of sight and vice versa. Bridge member 21 is provided with adjustable legs 27 whereby the height and width of bridge may be varied to alter the distance between the optical centers of the lenses so as to position them in desired relation to the line of sight through the lenses.

It is to be understood that although an ophthalmic mounting having rim-type lens holding means is illustrated, other types of ophthalmic mountings may be formed with such lenses; for example, rimless type ophthalmic mountings having lens strap connections with the lenses by which the bridge and temples are secured in desired relation to the lenses or semi-frame type constructions recently introduced in the art.

It is to be understood that the percentage of the various ingredients given in the compositions of the different lens mediums set forth in the specification may be varied within workable limits as usual in the art.

In Fig. I there is shown a bifocal lens having two fields. It is clear that if the minor portion be divided transversely into more than two parts, trifocal and multifocal lenses may be made as desired, depending upon the number of pieces in the minor portion.

Another desirable high index glass which has been used for the portion 5 with success is substantially as follows:

| | |
|---|---:|
| $SiO_2$ | 37.50 |
| $B_2O_3$ | 3.70 |
| $ZrO_2$ | 2.50 |
| $TiO_2$ | 3.50 |
| $CaO$ | 3.07 |
| $PbO$ | 20.00 |
| $BaO$ | 21.60 |
| $Na_2O$ | 2.73 |
| $K_2O$ | 4.20 |
| $Sb_2O_5$ | .60 |
| $As_2O_5$ | .60 |

This glass has a reciprocal relative dispersion of approximately 39 to 45, a coefficient of expansion substantially the same as the major portion of the glass 1 and index of refraction of approximately 1.65. It is particularly noted that this glass, as well as the previously disclosed glass, for the portion 5, has a relatively high barium content and it is to be understood that the general reference to a barium glass will include either of said described glasses.

It is particularly pointed out that the combined soda and potash content in the glass for the major portion 1 and for the filler piece or minor portion 2 is approximately not more than 16% of the total batch and that when one of said ingredients is increased or decreased the other is proportionately increased or decreased so as to maintain the desired total. In all instances, however, it has been essential to maintain the potassium oxide content to not less than 4% of the approximate 15 to 16% of the total batch and not more than the sodium oxide content. The most desirable percentage is approximately 6.5% potassium oxide and approximately 8.5% sodium oxide. This is so that the total alkali does not go too high with a danger of introducing the wrong coefficient of expansion and causing the glass in general to be too soft.

Having described my invention, I claim:

1. A blank for a multifocal lens, said blank comprising a major portion of glass having a recess with a finished optical surface therein, and a composite button of a plurality of pieces of glass fused transversely in edge to edge relation with each other and fused in said recess, said major portion being of optical crown glass containing within a variation of approximately plus or minus 1 percent of approximately 71 percent silicon oxide, 12.5 percent calcium oxide, and sodium oxide and potassium oxide of a combined amount of approximately 15 percent with said sodium oxide of said combined amount being approximately 8.25 percent and the potassium oxide being approximately 6.5 percent, said glass containing minor ingredients such as sodium sulphate, sodium chloride and antimony oxide in percentages of less than 1.00 percent, said major portion having a refractive index of about 1.52 and a reciprocal relative dispersion of about 55 to 60, one of said pieces of glass of said composite button being of substantially the same glass as the major portion and the other of said pieces being of a relatively high index of refraction, all of said glasses having substantially the same expansion factor so that they will stably unite on fusion, said completed blank having a finished optical surface on the segment side thereof.

2. A multifocal lens, said multifocal lens comprising a major portion of glass having a recess with a finished optical surface therein, and a composite button of a plurality of pieces of glass fused transversely in edge to edge relation with each other and fused in said recess, said major portion being of optical crown glass containing within a variation of approximately plus or minus 1 percent of approximately 71 percent silicon oxide, 12.5 percent calcium oxide, and sodium oxide and potassium oxide of a combined amount of approximately 15 percent with said sodium oxide of said combined amount being approximately 8.25 percent and the potassium oxide being approximately 6.5 percent, said glass containing minor ingredients such as sodium sulphate, sodium chloride and antimony oxide in percentages of less than 1.00 percent, said major portion having a refractive index of about 1.52 and a reciprocal relative dispersion of about 55 to 60, one of said pieces of glass of said composite button being of substantially the same glass as the major portion and the other of said pieces being of a relatively high index of refraction, all of said glasses having substantially the same expansion factor so that they will stably unite on fusion, said completed lens having a finished optical surface on the segment side thereof and a finished optical surface on the opposed side thereof which in combination with the first optical surface will complete the optical powers desired of the different focal fields of the lens.

EDGAR D. TILLYER.